US012509123B2

(12) United States Patent
Liu et al.

(10) Patent No.: US 12,509,123 B2
(45) Date of Patent: Dec. 30, 2025

(54) PREDICTION OF NEAR-FUTURE BEHAVIOR OF ROAD USERS

(71) Applicant: Zenseact AB, Gothenburg (SE)

(72) Inventors: Dapeng Liu, Gothenburg (SE); Junsheng Fu, Nödinge (SE)

(73) Assignee: Zenseact AB, Gothenburg (SE)

( * ) Notice: Subject to any disclaimer, the term of this patent is extended or adjusted under 35 U.S.C. 154(b) by 253 days.

(21) Appl. No.: 18/313,520

(22) Filed: May 8, 2023

(65) Prior Publication Data

US 2023/0356753 A1    Nov. 9, 2023

(30) Foreign Application Priority Data

May 9, 2022 (EP) .................................. 22172382

(51) Int. Cl.
*B60W 60/00* (2020.01)
*B60W 30/095* (2012.01)
*B60W 40/04* (2006.01)
*G06N 3/045* (2023.01)

(52) U.S. Cl.
CPC .... *B60W 60/0027* (2020.02); *B60W 30/0956* (2013.01); *B60W 40/04* (2013.01); *G06N 3/045* (2023.01); *B60W 2554/4041* (2020.02); *B60W 2554/4046* (2020.02); *B60W 2556/10* (2020.02)

(58) Field of Classification Search
CPC ......... B60W 60/0027; B60W 30/0956; B60W 40/04; B60W 2554/4041; B60W 60/00276; B60W 2556/40; B60W 50/0097; G06N 3/045; G06N 3/0442; G06V 20/58; G06V 10/82; G06V 20/588
See application file for complete search history.

(56) References Cited

U.S. PATENT DOCUMENTS

| | | | |
|---|---|---|---|
| 11,636,307 B2* | 4/2023 | Urtasun | G08G 1/0112 701/25 |
| 12,242,262 B2* | 3/2025 | Cella | G01C 21/3461 |
| 2021/0001884 A1 | 1/2021 | Alvarez et al. | |

(Continued)

OTHER PUBLICATIONS

EPO Communication with European Search Report dated Oct. 10, 2022 for Patent Application No. 22172382.8 filed May 9, 2022, consisting of 10-pages.

*Primary Examiner* — Peter D Nolan
*Assistant Examiner* — Anwar Mohamed
(74) *Attorney, Agent, or Firm* — Weisberg I.P. Law, P.A.

(57) ABSTRACT

An assessment system obtains a state of the vehicle, and identifies lane segments void from road users. Input having data associated with the lane segments, data associated with the road users states and historic data associated with the road users states and/or lane segments, is encoded into respective states-related data associated with the road users states and segment-related data associated with dynamic start and end boundaries of the lane segments. One or more neural networks encode the road users states in view of the lane segments spatially and temporally, and output spatial- and temporal-processed respective states-related data and segment-related data. The output data associated with one or more of the road users (target road users) is fed to at least a first behavior-predicting neural network to predict and output data indicating predicted near-future behavior of the target road users in view of one or more of the lane segments.

18 Claims, 5 Drawing Sheets

(56) References Cited

U.S. PATENT DOCUMENTS

| | | | |
|---|---|---|---|
| 2021/0004012 A1* | 1/2021 | Marchetti-Bowick | ............... G05D 1/0221 |
| 2021/0074162 A1 | 3/2021 | Jafari Tafti et al. | |
| 2021/0213978 A1 | 7/2021 | Edling et al. | |
| 2025/0080477 A1* | 3/2025 | Morrison | ............... G06N 3/08 |

* cited by examiner

PREDICTION OF NEAR-FUTURE BEHAVIOR OF ROAD USERS

TECHNICAL FIELD

The present disclosure relates to predicting near-future behavior of road users in surroundings of a vehicle, such as of an ADS-equipped vehicle.

BACKGROUND

Within the automotive field, there has for quite some years been activity in the development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to a greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. RADAR, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

For decision-making of an ADS, it may be beneficial that the ADS can predict surrounding road user(s)' behavior, such as driving behavior should a surrounding road user be represented by a vehicle. That is, an ADS would commonly be expected to detect surrounding road user(s)' state(s), and use the real-time states as input for decision-making. In addition, the ADS may then be expected to predict the surrounding road user(s)' near-future behavior—e.g. driving behavior—by predicting future states of the surrounding road user(s), such as estimating the surrounding road user(s)' position and/or orientation (pose), velocity and/or acceleration etc., for a predeterminable upcoming period of time, such as in the next e.g. three seconds. Although it is known that the road structure—along with surrounding road users' behavior and gaps in between—affect a road user's behavior, predicting road user(s)' near-future behavior—such as intentions and/or future trajectories—remains a challenge.

SUMMARY OF THE INVENTION

It is therefore an object of embodiments herein to provide an approach for in an improved and/or alternative manner predict near-future behavior—such as near-future driving behavior—of road users in surroundings of a vehicle, such as of an ADS-equipped vehicle.

The object above may be achieved by the subject-matter disclosed herein. Embodiments are set forth in the appended claims, in the following description and in the drawings.

The disclosed subject-matter relates to a method performed by an assessment system for predicting near-future behavior of road users in surroundings of a vehicle. The assessment system obtains a state of the vehicle, which vehicle state comprises at least a pose of the vehicle in view of a digital map. The assessment system further obtains from the digital map, map data associated with the vehicle pose, wherein the map data is transformed to a selected coordinate system. Moreover, the assessment system obtains states of road users in the vehicle's surroundings. Furthermore, the assessment system identifies by assessing the road users states in view of the map data in the selected coordinate system, lane segments void from road users. Moreover, the assessment system encodes network input comprising data associated with the lane segments, data associated with the road users states and historic data associated with the road users states and/or lane segments, into respective states-related data associated with the road users states and segment-related data associated with dynamic start and end boundaries of the lane segments. The assessment system further feeds the respective states-related data and segment-related data to one or more neural networks configured to encode the road users states in view of the lane segments spatially and temporally, and output spatial- and temporal-processed respective states-related data and segment-related data.

Moreover, the assessment system feeds output spatial- and temporal-processed respective states-related data and segment-related data associated with one or more of the road users—referred to as target road user(s)—to at least a first behavior-predicting neural network configured to, by processing said data, predict and output data indicating predicted near-future behavior of the target road user(s) in view of one or more of the lane segments.

The disclosed subject-matter further relates to an assessment system for—and/or adapted and/or configured for—predicting near-future behavior of road users in surroundings of a vehicle. The assessment system comprises a vehicle state obtaining unit for obtaining a state of the vehicle, which vehicle state comprises at least a pose of the vehicle in view of a digital map. The assessment system further comprises a map data obtaining unit for obtaining from the digital map, map data associated with the vehicle pose, wherein the map data is transformed to a selected coordinate system. Furthermore, the assessment system comprises a road users states obtaining unit for obtaining states of road users in the vehicle's surroundings. Moreover, the assessment system comprises a lane segments identifying unit for identifying by assessing the road users states in view of the map data in the selected coordinate system, lane segments void from road users. The assessment system further comprises a data encoding unit for encoding network input comprising data associated with the lane segments, data associated with the road users states and historic data associated with the road users states and/or lane segments, into respective states-related data associated with the road users states and segment-related data associated with dynamic start and end boundaries of the lane segments. Furthermore, the assessment system comprises a spatial/temporal NN feeding unit for feeding respective states-related data and segment-related data to one or more neural networks configured to encode the road users states in view of the lane segments spatially and temporally, and output spatial- and temporal-processed respective states-related data and segment-related data. Moreover, the assessment system comprises a predicting NN feeding unit for feeding output spatial- and temporal-processed respective states-related data and segment-related data associated with one or more of the road users—referred to as target road user(s)—to at least a first behavior-predicting neural network configured to, by processing said data, predict and output data indicating predicted near-future behavior of the target road user(s) in view of one or more of the lane segments.

Furthermore, the disclosed subject-matter relates to a vehicle comprising an assessment system as described herein.

Moreover, the disclosed subject-matter relates to a computer program product comprising a computer program containing computer program code means arranged to cause a computer or a processor to execute the steps of the assessment system described herein, stored on a computer-readable medium or a carrier wave. The disclosed subject-matter further relates to a non-volatile computer readable storage medium having stored thereon said computer program product.

Thereby, there is introduced an approach predicting near-future behavior—such as near-future intentions and/or trajectories—of road user(s) in vicinity of a—e.g. ADS-equipped—vehicle, which subsequently may support decision-making for said vehicle. That is, since there is obtained a state of the vehicle, which vehicle state comprises at least a pose of the vehicle in view of a digital map, there is acquired and further established in consideration of at least a first map such as an HD map, a current or essentially current position and orientation of the vehicle, potentially along with other state data such as e.g. vehicle speed, acceleration and/or deceleration etc. Furthermore, that is, since there is obtained from the digital map, map data associated the vehicle pose, wherein the map data is transformed to a selected coordinate system, there is acquired and further translated to a preferred coordinate system—for instance from a global coordinate system to a local ego-vehicle coordinate system—at least a portion of map data, for instance map data at least to some extent surrounding and/or being ahead of the vehicle pose. Moreover, that is, since there is obtained states of road users in the vehicle's surroundings, there is acquired—for instance based on sensor data and/or perception data e.g. from surrounding detecting sensors and/or a perception system—states data and/or object information of one or more traffic participants in vicinity of the vehicle, such as respective current or essentially current position(s), orientation(s), vehicle speed(s), acceleration(s) and/or deceleration(s) etc. Furthermore, that is, since there is identified by assessing the road users states in view of the map data in the selected coordinate system, lane segments void from road users, there may be found so-called gaps, for instance respectively exceeding a predeterminable length and/or width, in between traffic participants in the surroundings of the vehicle. Moreover, that is, since network input comprising data associated with the lane segments, data associated with the road users states and historic data associated with the road users states and/or lane segments, is encoded into respective states-related data associated with the road users states and segment-related data associated with dynamic start and end boundaries of the lane segments, there is processed, e.g. with support from and/or utilizing an encoding mechanism, data related to the identified lane segments—e.g. derived from the transformed map data—and data of the obtained states, along with road user states-related and/or lane segments-related data of one or more previous time instants, such that there is output on one hand respective road user-specific road user states-related data and on the other hand respective lane segment-specific data comprising dynamic start and end boundaries of corresponding lane segment, which respective output data for instance is represented by respective nodes and/or a respective tensor of equal number of elements. Furthermore, that is, since there is fed respective states-related data and segment-related data to one or more neural networks configured to encode the road users states in view of the lane segments spatially and temporally, and output spatial- and temporal-processed respective states-related data and segment-related data, there is output from at least a first neural network—which is adapted for spatially and temporally modelling and/or functionally capture the obtained road users states e.g. along with the ego-vehicle state in consideration of the identified lane segments—on one hand respective road user-specific road user states-related data e.g. nodes and/or tensor and on the other hand respective lane segment-specific data e.g. nodes and/or tensor, which then has been both spatially as well as temporally processed. Accordingly, interactions among the lane segments and the road users are modelled—e.g. with support from a neural network utilizing multi-head and/or self-attention operations—and respective data containing valuable information over time and/or through time instances is output, e.g. with support from and/or utilizing an LSTM network. Moreover, that is, since there is fed output spatial- and temporal-processed respective states-related data and segment-related data associated with one or more of the road users—referred to as target road user(s)—to at least a first behavior-predicting neural network configured to, by processing said data, predict and output data indicating predicted near-future behavior of the target road user(s) in view of one or more of the lane segments, there is on one hand input spatial- and temporal-processed states-related data of the at least first target road user and on the other hand input spatial- and temporal-processed segment-related data of lane segments relevant for said target road user(s), to one or more behavior-predicting neural networks adapted for—based on the input—producing and output predicted short-term future behavior—such as driving behavior—of the target road user(s) in relation to and/or pertinent differing lane segments. Accordingly, with the introduced concept, there may for one or more selected surrounding road users be predicted—with support from one or more behavior-predicting networks e.g. utilizing attention operations and/or mechanisms—respective behavior such as e.g. intentions and/or trajectories—e.g. for the next few seconds—in view of the different lane segments, i.e. in view of the differing so-called gaps.

In other words, for behavior and/or or trajectory prediction in general, intentions of traffic participants are a key factor. Knowing the intentions of other traffic participants may reduce uncertainties and improve performance of a driving system, e.g. of an ADS. Since there commonly are intrinsic uncertainties in driving intentions such as in human drivers' intentions, it may hence be beneficial to incorporate the uncertainties for reliable predictions. The concept described herein thus addresses such uncertainties by—for a traffic scene such as e.g. the exemplifying lane-merge scenario depicted in FIG. 2—introducing a near-future behavior- and/or intention-expressive representation thereof.

For that reason, an approach is provided for in an improved and/or alternative manner predict near-future behavior—such as near-future driving behavior—of road users in surroundings of a vehicle, such as of an ADS-equipped vehicle.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to predicting near-future behavior of road users in surroundings of a vehicle such as of an ADS-equipped vehicle, there will be disclosed an approach predicting near-future behavior—such as near-future intentions and/or trajectories—of road user(s) in vicinity of a—e.g. ADS-equipped—vehicle, which subsequently may support decision-making for said vehicle.

Figure 1:
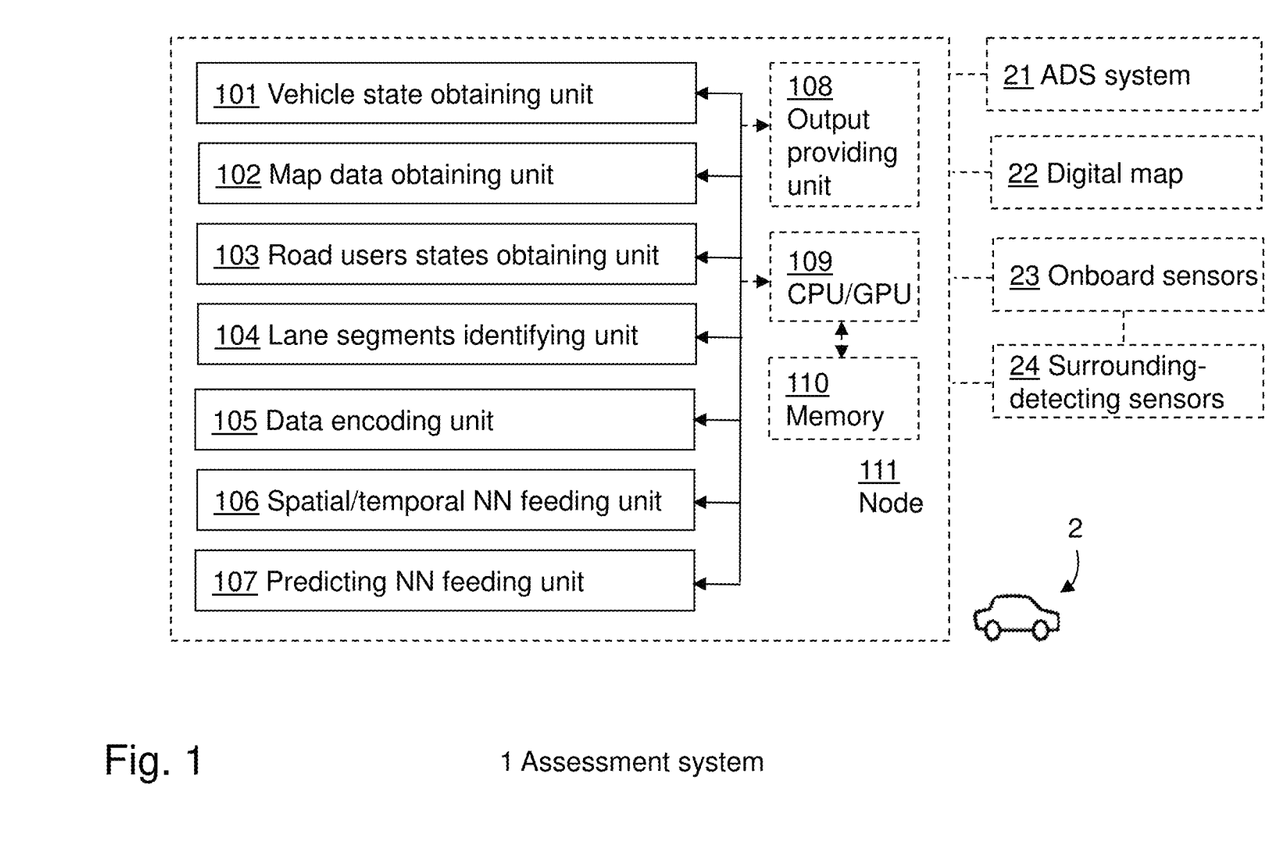
FIG. 1 is a schematic block diagram illustrating an exemplifying assessment system according to embodiments of the disclosure.

Referring now to the figures, there is depicted in FIG. 1 a schematic block diagram illustrating an exemplifying assessment system 1 according to embodiments of the disclosure. The assessment system 1 is adapted and/or configured for predicting near-future behavior of road users in surroundings of a vehicle 2. The vehicle 2—which throughout may be referred to as a host vehicle and/or ego-vehicle—may be represented by any arbitrary—e.g. known—manned or unmanned vehicle, for instance engine-propelled and/or electrically-powered, such as by a car, truck, lorry, van, bus and/or tractor, etc. Furthermore, the vehicle 2 may be equipped with and/or have onboard an ADS 21, which may be represented by any arbitrary ADAS or AD system e.g. known in the art and/or yet to be developed. Respective vehicle 2 and/or ADS 21 may comprise and/or be provided with a perception system (not shown) adapted to estimate vehicle surroundings, and subsequently adapted to estimate world views of the surroundings e.g. with support from a—e.g. commonly known—digital map 22 such as a high definition, HD, map, and/or an equivalent and/or successor thereof. Such a perception system may refer to any commonly known system, module and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc. The perception system—which may be adapted to support e.g. sensor fusion, tracking, localization etc.—may thus be adapted to rely on sensory information. Such exemplifying sensory information may, for instance, be derived from one or more—e.g. commonly known—sensors 23 comprised in and/or provided onboard the ADS-equipped vehicle 2 adapted to sense and/or perceive said vehicle's 2 whereabouts and/or surroundings, for instance represented by one or a combination of one or more of surrounding detecting sensors 24 and/or a positioning system, odometer, inertial measurement units etc. In other words, such a perception system is in the present context thus to be understood as a system responsible for acquiring raw sensor data from onboard sensors 23, such as from surrounding detecting sensors 24 etc., and converting this raw data into scene understanding. Furthermore, the phrase "in surroundings of a vehicle", may refer to "near, in vicinity of, within sensor range of and/or within a predeterminable distance from a vehicle", and according to an example further to "in surroundings of an ADS-equipped vehicle". Moreover, the phrase "assessment system" may refer to "upcoming behavior assessment system", "near-future behavior assessment system", "future behavior assessment system", "behavior predicting system" and/or merely "predicting system". According to an example, "assessment system" may further refer to "onboard assessment system", "driving behavior assessment system", "intention assessment system" and/or "intention and/or trajectory assessment system". Moreover, "a method performed by an assessment system" may refer to "an at least partly computer-implemented method performed by an assessment system", whereas "for predicting near-future behavior of road users" may refer to "for supporting prediction of near-future behavior of road users", "for estimating and/or determining near-future behavior of road users", "for predicting upcoming and/or future behavior of road users", "for predicting near-future intentions—e.g. driving intentions—and/or trajectories of road users", "for predicting near-future behavior of one or more road users" and/or "for predicting near-future behavior of traffic participants e.g. other vehicles". According to an example, "for predicting near-future behavior of road users in surroundings of a vehicle" may refer to "for predicting near-future behavior of road users in surroundings of a vehicle and potentially further predicting near-future behavior also of said vehicle". Throughout, "road user" may potentially comprise the vehicle 2.

As illustrated in an exemplifying manner in exemplifying FIG. 1, the assessment system 1 is further—e.g. by means of a vehicle state obtaining unit 101—adapted and/or configured for obtaining a state of the vehicle 2, which vehicle state comprises at least a pose of the vehicle 2 in view of a digital map 22. Thereby, there is acquired and further established in consideration of at least a first map 22 such as an HD map, for instance located onboard the vehicle 2, a current or essentially current position and orientation of the vehicle 2, potentially along with other state data such as e.g. vehicle speed, acceleration and/or deceleration etc.

The vehicle state may be obtained in any feasible—e.g. known—manner, for instance with support from—and/or based on sensor data from—onboard sensors 23. Such onboard sensor 23 may for instance relate to inertial sensors e.g. configured to detect linear acceleration using one or more accelerometers and/or rotational rate using one or more gyroscopes etc., and/or a vehicle localization system adapted and/or configured for monitoring a geographical position and heading of the vehicle 2, e.g. relating to a GNSS such as a GPS and/or a Real Time Kinematics (RTK) GPS for improved accuracy. According to an example, the vehicle pose may for instance be represented by a 2D Cartesian position and a yaw of the vehicle 2, or a 6D pose where the position is defined by a 3D Cartesian position and the orientation by a roll, pitch and yaw of the vehicle 2. The digital map 22 may—as touched upon above—refer to any feasible—e.g. known—onboard and/or offboard digital map, such as a high definition, HD, map, and/or an equivalent and/or successor thereof. The phrase "obtaining a state of said vehicle" may refer to "determining, acquiring, retrieving, gathering and/or deriving a state of said vehicle" and/or "obtaining information and/or a status of said vehicle", and according to an example further to "obtaining based on sensor data acquired with support from sensors such as onboard sensors, a state of said vehicle" and/or "obtaining data indicating a state of said vehicle". Moreover, "the vehicle state comprising at least a pose of said vehicle in view of a digital map" may refer to "the vehicle state comprising at least a pose—and potentially further a velocity, acceleration and/or deceleration—of said vehicle in view of a digital map" and/or "the vehicle state comprising a pose of said vehicle in view of a digital map", whereas "in view of a digital map" may refer to "in a digital map".

As illustrated in an exemplifying manner in exemplifying FIG. 1, the assessment system 1 is further—e.g. by means of a map data obtaining unit 102—adapted and/or configured for obtaining from the digital map 22, map data associated the vehicle pose, wherein the map data is transformed to a selected coordinate system. Thereby, there is acquired and further translated to a preferred coordinate system—for instance from a global coordinate system to a local ego-vehicle coordinate system—at least a portion of map data, for instance map data at least to some extent surrounding and/or being ahead of the vehicle pose.

The selected coordinate system may be represented by and/or relate to any feasible coordinate system, such as a local coordinate system of the vehicle 2. The selected coordinate system may accordingly be represented by and/or relate to for instance a 3D ego-vehicle coordinate system and/or a 3D Cartesian frame, such as with an exemplifying origin in the centre of a rear axis of the vehicle 2. Moreover, a portion of the digital map 22 which to transform, may be selected in any feasible manner taking at least the predicted vehicle pose into consideration in selection thereof, e.g. selecting an area and/or region surrounding the vehicle 2 in one or more directions, e.g. up to several hundred meters or more. The map data may comprise any feasible—e.g. commonly known—map-related data, such as relating to roads, road structures, lanes, road-side—e.g. static—elements and/or objects, etc. The phrase "obtaining from said digital map" may refer to "deriving, acquiring and/or retrieving from said digital map", whereas "map data associated with the vehicle pose" may refer to "at least a portion of map data associated with the vehicle pose", "pose-influenced and/or pose-depending map data", "map data surrounding the vehicle pose", "map data at least partly surrounding the vehicle pose" and/or "map data surrounding in one or more directions the vehicle pose". Moreover, "map data is transformed" may refer to "map data is translated and/or mapped", whereas "to a selected coordinate system" may refer to "to a preferred and/or predeterminable coordinate system", and according to an example further to "from a global coordinate system to a selected coordinate system".

Figure 2:
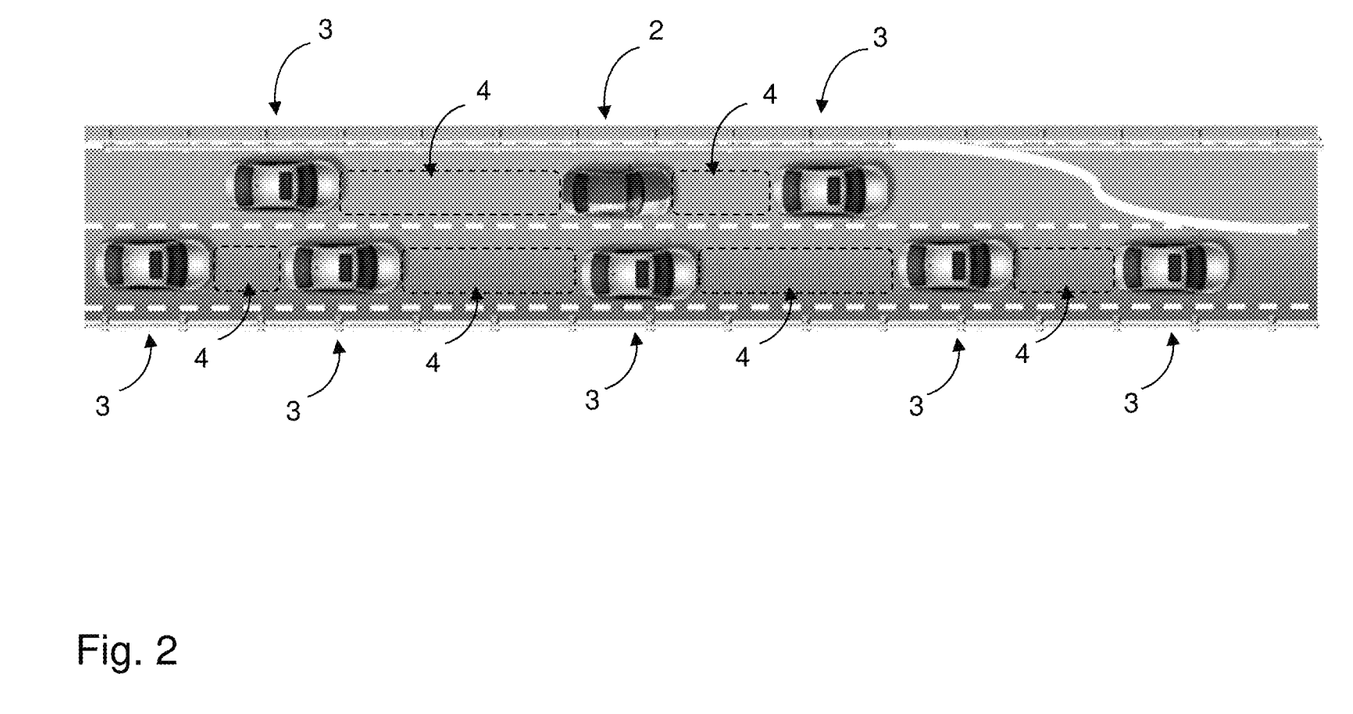
FIG. 2 depicts a schematic view of an exemplifying lane-merge traffic scenario handled by an exemplifying assessment system according to embodiments of the disclosure.

As illustrated in an exemplifying manner in exemplifying FIG. 1 and further in exemplifying FIG. 2 which depicts a schematic view of an exemplifying lane-merge traffic scenario, the assessment system 1 is further—e.g. by means of a road users states obtaining unit 103—adapted and/or configured for obtaining states of road users 3 in the vehicle's 2 surroundings. Thereby, there is acquired—for instance based on sensor data and/or perception data e.g. from surrounding detecting sensors 24 and/or a perception system—states data and/or object information of one or more traffic participants 3 in vicinity of the vehicle 2, such as respective current or essentially current position(s), orientation(s), vehicle speed(s), acceleration(s) and/or deceleration(s) etc.

The road users 3 in the vehicle's 2 surroundings may be represented by any feasible one or more traffic participants in vicinity of said vehicle 2, such as—as depicted in an exemplifying manner in FIG. 2—other vehicles 3. Such other vehicles 3 may e.g. be manned or unmanned vehicles, for instance engine-propelled and/or electrically-powered, such as cars, trucks, lorries, vans, busses, tractors, motorcycles, etc. According to an example, the road users 3 may further be represented by non-vehicles and/or vulnerable road users, such as e.g. pedestrians, bicyclists, roller skaters, etc. Obtaining states of road users 3 in the vehicle's 2 surroundings does not necessarily translate into states being obtained for every single surrounding road user 3; potentially, merely states of selected and/or filtered road users 3 may be obtained, such as for instance of road users 3 being positioned along a same road and/or travelling in a same direction as the vehicle 2, and/or road user 3 being within a predeterminable distance from the vehicle 2. The states of the road users 3 may be obtained in any feasible—e.g. known—manner, for instance with support from—and/or based on sensor data and/or perception data from and/or assessed or generated by—surrounding detecting sensors 24 and/or perception system(s), for instance onboard the vehicle 2. According to an example, states of road users 3 may additionally or alternatively potentially be gathered with support from inter-vehicle communication, V2V/V2I/V2X communication, swarm service(s) and/or cloud service (s) etc. The phrase "obtaining states of road users" may refer to "determining, acquiring, retrieving, gathering and/or deriving states of road users" and/or "obtaining information e.g. object information and/or status of road users", and according to an example further to "obtaining from—and/or by assessing—sensor data and/or perception data, states of road users" and/or "obtaining data indicating states of road users". Moreover, "states" may refer to "road users states", whereas "in said vehicle's surroundings" may refer to "in surroundings of said vehicle" and/or "near, in vicinity of, within sensor range of and/or within a predeterminable distance from said vehicle".

As illustrated in an exemplifying manner in exemplifying FIGS. 1 and 2, the assessment system 1 is further—e.g. by means of a lane segments identifying unit 104—adapted and/or configured for identifying by assessing the road users states in view of the map data in the selected coordinate system, lane segments 4 void from road users 3. Thereby, there may be found so-called gaps 4 and/or lane gaps 4, for instance respectively exceeding a predeterminable length and/or width, in between traffic participants 3 in the surroundings of the vehicle 2.

The lane segments 4 void from road users 3—which may be considered arising from and/or being formed and/or defined by the disposition of road users 3 in vicinity of one another such as in between two consecutive road users 3 e.g.

traveling in a same direction—may be identified in any feasible manner by evaluation of the obtained states of the surrounding road users 3 in consideration of the obtained map data in the selected coordinate system. Said lane segments 4 may thus be represented by any one or more dynamic lane gaps between road users 3, and further be of any feasible length(s) and/or dimensions. According to an example, lane segments 4 having lengths—e.g. in a longitudinal direction of the corresponding lane(s)—not reaching a predeterminable threshold length, e.g. of less than a meter up to several meters or more, may be ignored and/or discarded. The phrase "identifying by assessing" may refer to "determining and/or finding by assessing" and/or "identifying by evaluating and/or mapping". "Lane segments void from road users", on the other hand, may refer to "spaces and/or gaps e.g. lane gaps void from road users", "road user free lane segments", "lane segments of said map data void from road users", "potential lane segments void from road users" and/or "dynamic lane segments void from road users", and according to an example further to "lane segments void from road users and/or obstacles".

Figure 3:
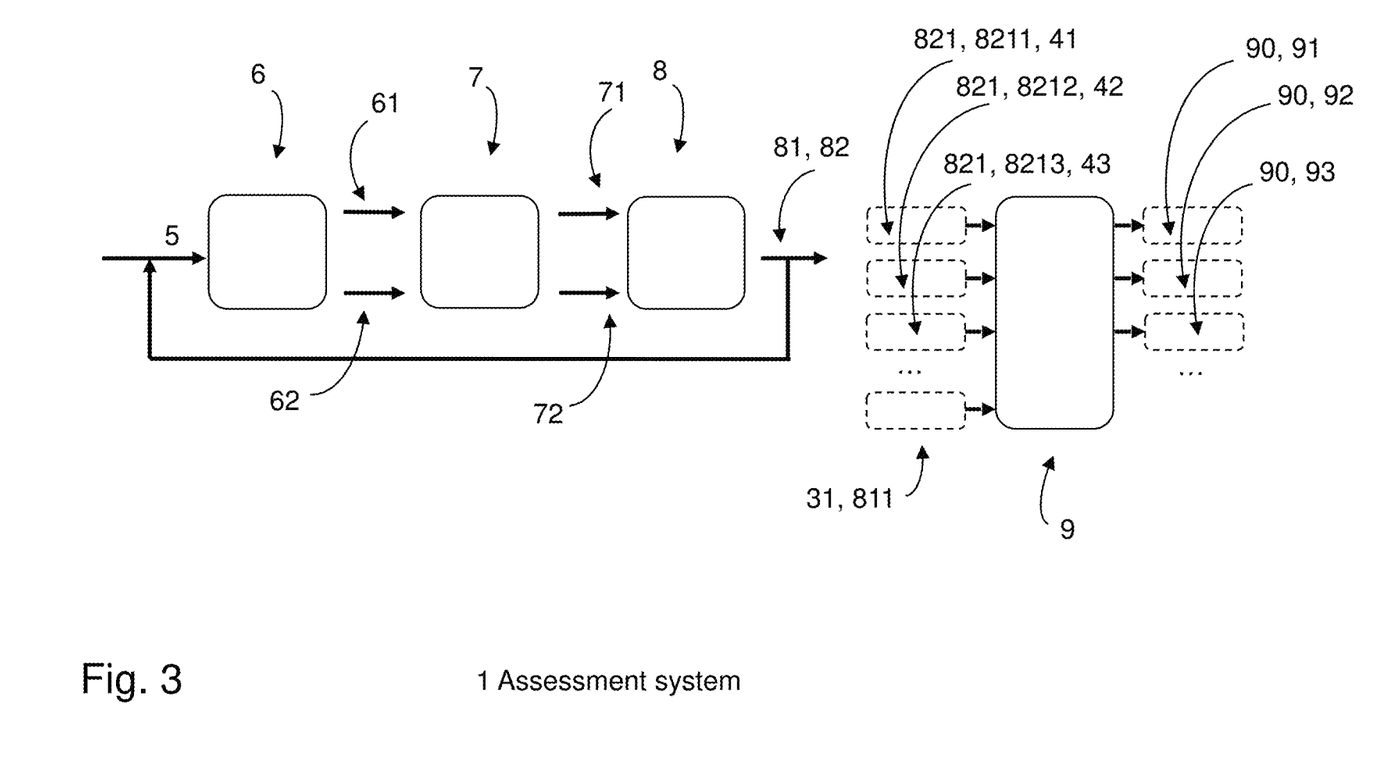
FIG. 3 depicts a schematic view of an exemplifying assessment system according to embodiments of the disclosure.

As illustrated in an exemplifying manner in exemplifying FIGS. 1 and 2, and further in exemplifying FIG. 3, the assessment system 1 is further—e.g. by means of a data encoding unit 105—adapted and/or configured for encoding network input 5 comprising data associated with the lane segments 4, data associated with the road users states and historic data associated with the road users states and/or lane segments 4, into respective states-related data 61 associated with the road users states and segment-related data 62 associated with dynamic start and end boundaries of the lane segments 4. Thereby, data related to the identified lane segments 4—e.g. derived from the transformed map data—and of the obtained states, along with road user states-related and/or lane segments-related data of one or more previous time instants, is processed—e.g. with support from and/or utilizing an encoding mechanism—to output on one hand respective road user-specific road user states-related data 61 and on the other hand respective lane segment-specific data 62 comprising dynamic start and end boundaries of the corresponding lane segment 4, which respective data 61, 62 for instance is represented by respective nodes and/or a respective tensor 61, 62 of equal number of elements.

The data associated with the lane segments 4 may be represented by any feasible data describing spatial boundaries of, properties of and/or relating to the identified lane segments 4, and for instance be represented by data of the obtained digital map data associated therewith, such as e.g. of corresponding lane width(s), lane centre line(s), lane heading(s), boundaries etc. describing the lane segment(s) 4. In a similar manner, the data associated with the road users states may be represented by any feasible data relating the obtained states, such as positions, orientations and/or velocities etc of surrounding road users 3, for instance including the vehicle 2. Furthermore, the historic data associated with the road users states and/or lane segments 4, may emanate from any feasible one or more previous predeterminable points in time—e.g. occurring and/or ranging less than a second up to several seconds or more back in time—and further be and/or have been derived in any feasible manner. The historic data may for instance have been obtained and/or identified with support from surrounding detecting sensors 24 and/or perception system(s). Additionally or alternatively, the historic data may—as illustrated in exemplifying FIG. 3—emanate from and/or be obtained from spatial- and temporal-processed respective states-related data and segment-related data (to be described further on) pertinent a previous time instant, which then may be combined—e.g. concatenated with—respective data associated with the lane segments 4 and road users states of the current time instant. Thus, for any given time instant, the data associated with the lane segments 4 and the data associated with the road users states, may be combined—e.g. concatenated—with spatial- and temporal-processed respective states-related data and segment-related data of a previous time instant.

Figure 4:
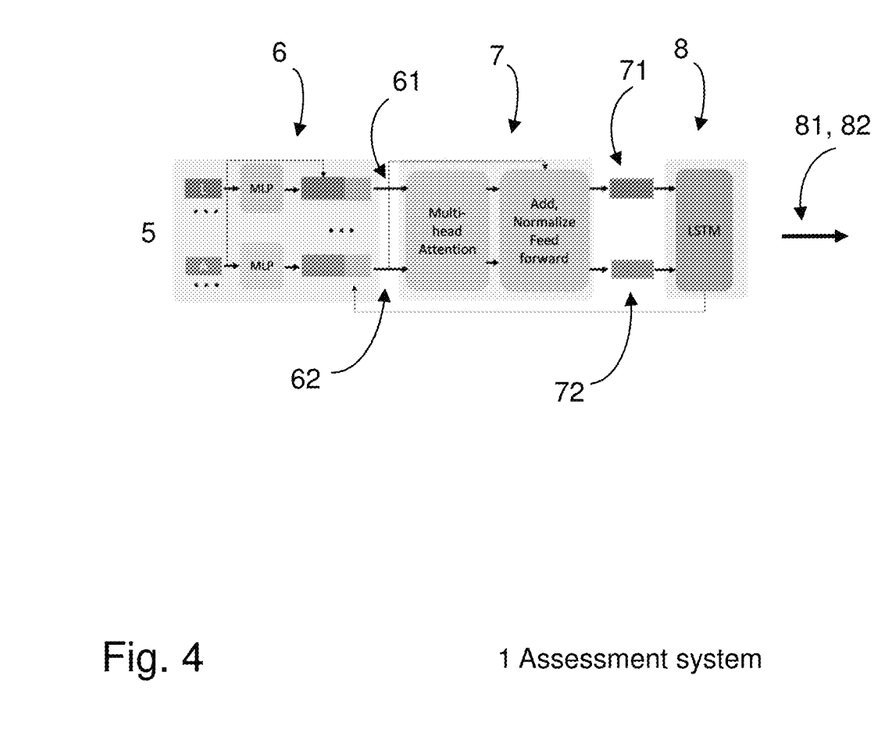
FIG. 4 depicts a schematic view of an exemplifying alternative assessment system according to embodiments of the disclosure.

The states-related data 61 may be represented by any feasible data, nodes, structures and/or a tensor related to the obtained road users states, such as e.g. current and historic positions, orientations, velocities, accelerations and/or decelerations etc. of said road users 3, for instance including the vehicle 2. In a similar manner, the segment-related data 62 may be represented by any feasible data, nodes, structures and/or a tensor related to the identified lane segments 4, i.e. the so-called gaps, such as e.g. current and historic start and/or end boundaries thereof. For instance, the start and end boundaries of the lane segments 4 may comprise segment-related e.g. longitudinal and/or lateral boundaries, lane widths, and/or positions of lane centres etc., and according to an example further to e.g. segment-related traffic signs and/or regulators e.g. traffic lights, and/or lane features such as orientations and/or curvatures. Encoding the network input 5 may be accomplished in any feasible manner, for instance with support from and/or utilizing an encoding mechanism, e.g. configured for processing and/or pre-processing of the network input 5. Optionally, and as illustrated in exemplifying FIG. 3, encoding the network input 5 may comprise—and/or the data encoding unit 105 may be adapted and/or configured for—feeding the network input 5 to an encoding neural network 6, e.g. a fully connected neural network, configured to process the network input 5 and output respective states-related data 61 and segment-related data 62. Simply put, the encoding mechanism may thus be represented by an encoding neural network 6, e.g. a fully connected neural network. An optional encoding neural network 6 is depicted in exemplifying FIG. 4. The phrase "an encoding neural network configured to process the network input" may refer to "an encoding neural network configured to pre-process the network input" and/or "an encoding neural network configured to process the network input to combine transformed map data and road users states", whereas "output said respective states-related data and segment-related data" may refer to "output said respective states-related data and segment-related data e.g. as nodes, structures and/or tensors of equal number of elements". The phrase "encoding network input", on the other hand, may refer to "encoding data" and/or "processing, pre-processing and/or combining network input", whereas "data associated with said lane segments" may refer to "data indicative of and/or comprising properties and/or boundaries of said lane segments", and according to an example further to "data of the transformed digital map data associated with said lane segments". Moreover, "data associated with said road users states" may refer to "data indicative of said road users states" and/or "data associated with at least a portion of said road users states", and according to an example further to "data associated with said road users states and said vehicle state". The phrase "historic data associated with said road users states and/or lane segments", on the other hand, may refer to "historic data associated with said road users states and/or lane segments pertinent at least a first previous time instant" and/or "historic data derived from previous spatial- and temporal-processed respective states-related data and segment-related data associated with said road users states and/or lane segments". Moreover, "respective states-related data [ . . . ] and segment-related data" may refer to "respective identity-maintaining states-related data [ . . . ] and identity-maintaining segment-related data", "respective road user-related data [ . . . ] and gap-related data" and/or "respective states-related data, structures, nodes and/or tensor [ . . . ] and segment-related data, structures, nodes and/or tensor", whereas "dynamic start and end boundaries of said lane segments" may refer to "spatial boundaries of said lane segments". According to an example, the phrase "into respective states-related data associated with said road users states and segment-related data associated with dynamic start and end boundaries of said lane segments" may refer to "into respective road user-specific road user states-related data and respective lane segment-specific segment-related data comprising dynamic start and end boundaries of corresponding lane segment".

As illustrated in an exemplifying manner in exemplifying FIGS. 1-3, the assessment system 1 is further—e.g. by means of a spatial/temporal NN feeding unit 106—adapted and/or configured for feeding the respective states-related data 61 and segment-related data 62 to one or more neural networks configured to encode the road users states in view of the lane segments 4 spatially and temporally, and output spatial- and temporal-processed respective states-related data 81 and segment-related data 82. Thereby, the encoded road user-specific states-related data 61 and segment-specific segment-related data 62 is input to one or more neural networks adapted for spatially and temporally modelling and/or functionally capture the obtained road users states—e.g. along with the ego-vehicle state—in consideration of the identified lane segments 4, whereupon there is output on one hand respective road user-specific road user states-related data 81—e.g. nodes and/or tensor—and on the other hand respective lane segment-specific data 82—e.g. nodes and/or tensor—which then has been both spatially as well as temporally processed. Accordingly, interactions among the lane segments 4 and the road users 3 are modelled—e.g. with support from a neural network utilizing multi-head and/or self-attention operations—and respective data 81, 82 containing valuable information over time and/or through time instances is output, e.g. with support from and/or utilizing an LSTM network.

Respective states-related data 61 and segment-related data 62 may be fed to any feasible one or more neural networks configured to encode the road users states in view of the lane segments 4 spatially and temporally, and output spatial- and temporal-processed respective states-related data 81 and segment-related data 81. Optionally, however, and as illustrated in exemplifying FIG. 3, feeding respective states-related data 61 and segment-related data 62 to one or more neural networks may comprise—and/or the spatial/temporal NN feeding unit 106 may be adapted and/or configured for—feeding respective states-related data 61 and segment-related data 62 to a spatial neural network 7—such as an attention network—configured to encode the road users states in view of the lane segments 4 spatially, and output spatial-processed respective states-related data 71 and segment-related data 72. Feeding respective states-related data 61 and segment-related data 62 to one or more neural networks may then further comprise—and/or the spatial/temporal NN feeding unit 106 may then be adapted and/or configured for—feeding the spatial-processed respective states-related data 71 and segment-related data 72—such as of a current time instance—to a temporal neural network 8 configured to encode the road users states in view of the lane segments 4 temporally, and output spatial- and temporal-processed respective states-related data 81 and segment-related data 82. Simply put, the one or more neural networks may thus be represented by a spatial neural network 7 such as an attention network and a temporal neural network 8, for instance arranged in alternate order than depicted. Further optionally, feeding respective states-related data 61 and segment-related data 62 to one or more neural networks may comprise—and/or the spatial/temporal NN feeding unit 106 may be adapted and/or configured for—feeding to a transformer-based network, e.g. supporting multi-head and/or self-attention operations. Simply put, the one or more neural networks—such as the optional spatial neural network 7—may thus be represented by a transformer-based network e.g. supporting multi-head and/or self-attention operations. In a similar manner, optionally, feeding respective states-related data 61 and segment-related data 62 to one or more neural networks may comprise—and/or the spatial/temporal NN feeding unit 106 may be adapted and/or configured for—feeding to a Long short-term memory, LSTM, network. Simply put, the one or more neural networks—such as the optional temporal neural network 8—may thus be represented by an LSTM network. Optional respective spatial neural network 7 and temporal neural network 8 is depicted in exemplifying FIG. 4. The phrase "a spatial neural network configured to encode" may refer to "a neural network and/or spatial neural network configured to process said data in a spatial domain, to encode", whereas "encode said road users states in view of said lane segments spatially" may refer to "encode interactions of said road users states in view of said lane segments spatially" and/or "encode said road users states in view of said lane segments spatially e.g. with support from attention and/or transformer mechanisms". In a similar manner, "a temporal neural network configured to encode" may refer to "a neural network and/or a temporal neural network configured to process said data in a temporal domain, to encode", whereas "encode said road users states in view of said lane segments temporally" may refer to "encode interactions of said road users states in view of said lane segments temporally" and/or "encode said road users states in view of said lane segments over time". Moreover, "output spatial- and temporal-processed respective states-related data and segment-related data" may refer to "output spatial- and temporal-processed respective road user-specific states-related data and lane segment-specific segment-related data" As indicated in the foregoing, the previously discussed historic data associated with the road users states and/or lane segments 4, may be represented by the spatial- and temporal-processed respective states-related data 81 and segment-related data 82.

As illustrated in an exemplifying manner in exemplifying FIGS. 1-3, the assessment system 1 is further—e.g. by means of a predicting NN feeding unit 107—adapted and/or configured for feeding output spatial- and temporal-processed respective states-related data 811 and segment-related data 821 associated with one or more of the road users 3—referred to as target road user(s) 31—to at least a first behavior-predicting neural network 9 configured to, by processing said data 811, 821, predict and output data 90 indicating predicted near-future behavior of the target road user(s) 31 in view of one or more of the lane segments 4. Thereby, there in input on one hand spatial- and temporal-processed states-related data 811 of the at least first target road user and on the other hand input spatial- and temporal-processed segment-related data 821 of lane segments 4 relevant for said target road user(s) 31, to one or more behavior-predicting neural networks 9 adapted for—based on the input 811, 821—producing and output predicted short-term future behavior—such as driving behavior—of the target road user(s) 31 in relation to and/or pertinent differing lane segments 4. Accordingly, with the introduced concept, there may for one or more selected surrounding road users 31, and/or potentially the vehicle 2, be predicted—with support from one or more behavior-predicting networks 9 e.g. utilizing attention operations and/or mechanisms—respective behavior such as e.g. intentions and/or trajectories—e.g. for the next few seconds—in view of differing lane segments 4, i.e. in view of the differing so-called gaps.

In other words, for behavior and/or or trajectory prediction in general, intentions of traffic participants are a key factor. Knowing the intentions of other traffic participants may reduce uncertainties and improve performance of a driving system e.g. of an ADS 21. Since there commonly are intrinsic uncertainties in driving intentions such as in human drivers' intentions, it may hence be beneficial to incorporate the uncertainties for reliable predictions. The concept described herein thus addresses such uncertainties by—for a traffic scene such as e.g. the exemplifying lane-merge scenario depicted in FIG. 2—introducing a near-future behavior- and/or intention-expressive representation thereof.

In exemplifying FIG. 3, there is depicted how for a target road user 31, therewith associated spatial- and temporal-processed states-related-data 821 and spatial- and temporal-processed segment-related data 8211, 8212, 8213 of a respective exemplifying first, second and third lane segment 41, 42, 42, is input to the at least first behavior-predicting neural network 9, and how there is output a first predicted near-future behavior 91 of the target road user 31 in view of the first lane segment 41, a second predicted near-future behavior 92 of the target road user 31 in view of the second lane segment 42, and a third predicted near-future behavior 93 of the target road user 31 in view of the third lane segment 43. The target road user(s) 31—which may be selected in any preferred manner—may be represented by any feasible number out of the surrounding road users 3, and for instance be represented by a single road user 31 up to all road users 31. Moreover, respective spatial- and temporal-processed states-related data 811 and segment-related data 821 associated with target road user(s) 31, may be fed to any feasible one or more neural networks configured to predict and output data 90 indicating predicted near-future behavior of the target road user(s) 31 in view of one or more of the lane segments 4. Optionally, such feeding may comprise—and/or the predicting NN feeding unit 107 may be adapted and/or configured for—feeding to a graph network, e.g. a graph attention network. Simply put, the at least first behavior-predicting neural network 9 may thus be represented by a graph network such as a graph attention network. Further optionally, such feeding may comprise—and/or the predicting NN feeding unit 107 may be adapted and/or configured for—feeding to a behavior-predicting neural network 9 configured to, by processing said data 811, 821, predict and output data 90 indicating predicted intentions comprising a probability distribution of the target road user(s) 31 selecting the one or more lane segments 4. Thereby, there is produced by and output from the behavior-predicting neural network 9—which in such a case may comprise an/or be referred to as an intentions-predicting neural network—for a selected at least first road user 31 and/or road user state, a probability distribution over a discrete number of lane segments 4 as target intentions. Accordingly, the output predicted near-future behavior 90 of the target road user(s) 31 in view of one or more of the lane segments 4, may then comprise and/or be represented by respective lane segment's 4 predicted probability of being selected by the target road user(s) 31, i.e. as target intention. In exemplifying FIG. 3, this could be reflected by the first predicted near-future behavior 91 comprising and/or being represented by a predicted probability of the target road user 31 selecting the first lane segment 41, the second predicted near-future behavior 92 comprising and/or being represented by a predicted probability of the target road user 31 selecting the second lane segment 42, and the third predicted near-future behavior 93 comprising and/or being represented by a predicted probability of the target road user 31 selecting the third lane segment 43, thus reflecting respective predicted probability and/or likelihood of the target road user 31 merging into respective lane segment 41, 42, 43. The phrase "probability distribution of said target road user(s) selecting said one or more lane segments" may refer to "probability distribution of said target road user(s) selecting a respective lane segment out of said one or more lane segments".

Furthermore, optionally, additionally or alternatively, feeding output spatial- and temporal-processed respective states-related data 811 and segment-related data 821 associated with one or more target road users 31 to at least a first behavior-predicting neural network 9, may comprise—and/or the predicting NN feeding unit 107 may be adapted and/or configured for—feeding to a behavior-predicting neural network 9 configured to, by processing said data 811, 821, predict and output data 90 indicating predicted trajectories of one or more of the target road user(s) 31 in view of the one or more lane segments 4. Thereby, there is produced by and output from the behavior-predicting neural network 9—which in such a case may comprise an/or be referred to as a trajectory-predicting neural network—predicted potential trajectories and/or paths of a selected at least first road user 31 and/or road user state, into one or more of the lane segments 4. Accordingly, the output predicted near-future behavior 90 of the target road user(s) 31 in view of one or more of the lane segments 4, may then comprise and/or be represented by one or more differing possible trajectories for reaching at least a first lane segment(s) 4 for the target road user(s) 31. In exemplifying FIG. 3, this could be reflected by the first predicted near-future behavior 91 comprising and/or being represented by a first predicted trajectory for the target road user 31 to merge into e.g. the first lane segment 41, the second predicted near-future behavior 92 comprising and/or being represented by a second predicted trajectory for the target road user 31 to merge into said first lane segment 41, and the third predicted near-future behavior 93 comprising and/or being represented by a third predicted trajectory for the target road user 31 to merge into said first lane segment 41, thus reflecting a respective differing predicted trajectory applicable and/or feasible for the target road user 31 to merge into said first lane segment 41. Predicting trajectories of one or more of the target road user(s) 31 in view of the one or more lane segments 4, may be accomplished in any feasible manner, e.g. with support from and/or utilizing control and optimization techniques such as Model Predictive Control (MPC), taking into account safety and/or other constraints.

The phrase "feeding output spatial- and temporal-processed respective states-related data and segment-related data associated with one or more of said road users" may refer to "feeding output spatial- and temporal-processed respective states-related data and segment-related data related to one or more of said road users" and/or "feeding output spatial- and temporal-processed respective states-related data and segment-related data associated with one or more of said road users states". The phrase "behavior-predicting neural network", on the other hand, may refer to "near-future behavior-predicting neural network" and/or merely "neural network". Moreover, "data indicating predicted near-future behavior" may refer to "data, nodes and/or structures indicating predicted near-future behavior", "data comprising predicted near-future behavior", "data indicating estimated, expected and/or constructed near-future behavior", "data indicating predicted upcoming and/or future behavior and/or "data indicating predicted behavior pertinent a—e.g. predeterminable—short-term future e.g. ranging from less than a second up to several seconds or more", and according to an example further to "data indicating predicted near-future driving behavior" and/or "data indicating predicted near-future intentions and/or trajectories". The phrase "behavior of said target road user(s) in view of one or more of said lane segments", on the other hand, may refer to "behavior of said target road user(s) in view of at least a portion of said lane segments" and/or "behavior of said target road user(s) in view of applicable and/or relevant lane segments".

Optionally, and as illustrated in an exemplifying manner in exemplifying FIG. 1, the assessment system 1 may further—e.g. by means of an optional output providing unit 108—be adapted and/or configured for providing at least a portion of the data 90 indicating near-future predicted behavior to an ADS 21 of the vehicle 2 for decision-making and/or path-planning. Thereby, near-future behavior 90—predicted as described herein—of road user(s) 31 in surroundings of an ADS-equipped vehicle 2, may be communicated to, and subsequently potentially used as input by, modules of the ADS 21 handling decision-making and/or path-planning, to subsequently support decision-making for said vehicle 2.

As further shown in FIG. 1, the assessment system 1 comprises a vehicle state obtaining unit 101, a map data obtaining unit 102, a road users states obtaining unit 103, a lane segments identifying unit 104, a data encoding unit 105, a spatial/temporal NN feeding unit 106, a predicting NN feeding unit 107, and an optional output providing unit 108, all of which already have been described in greater detail above. Furthermore, the embodiments herein for predicting near-future behavior of road users in surroundings of a vehicle 2, may be implemented through one or more processors, such as a processor 109, for instance represented by at least a first Central Processing Unit, CPU, at least a first Graphics Processing Unit, GPU, at least a first Tensor Processing Unit, TPU, and/or at least a first Field-Programmable Gate Array, FPGA, together with computer program code for performing the functions and actions of the embodiments herein. Said program code may also be provided as a computer program product, for instance in the form of a data carrier carrying computer program code for performing the embodiments herein when being loaded into the assessment system 1. One such carrier may be in the form of a CD/DVD ROM disc and/or a hard drive, it is however feasible with other data carriers. The computer program code may furthermore be provided as pure program code on a server and downloaded to the assessment system 1. The assessment system 1 may further comprise a memory 110 comprising one or more memory units. The memory 110 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 110 may be arranged to be used to store e.g. information, and further to store data, configurations, scheduling, and applications, to perform the methods herein when being executed in the assessment system 1. For instance, the computer program code may be implemented in the firmware, stored in FLASH memory 110, of an embedded processor 109, and/or downloaded wirelessly e.g. from an off-board server. Furthermore, units 101-108, the optional processor 109 and/or the optional memory 110, may at least partly be comprised in one or more nodes 111 e.g. ECUs of the vehicle e.g. in and/or in association with the ADS 21. It should thus be understood that parts of the described solution potentially may be implemented in a system located external the vehicles 2, or in a combination of internal and external the vehicle 2, for instance in one or more servers in communication with the vehicle 2, e.g. in a so-called cloud solution. Those skilled in the art will also appreciate that said units 101-108 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 110, that when executed by the one or more processors such as the processor 109 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 5:
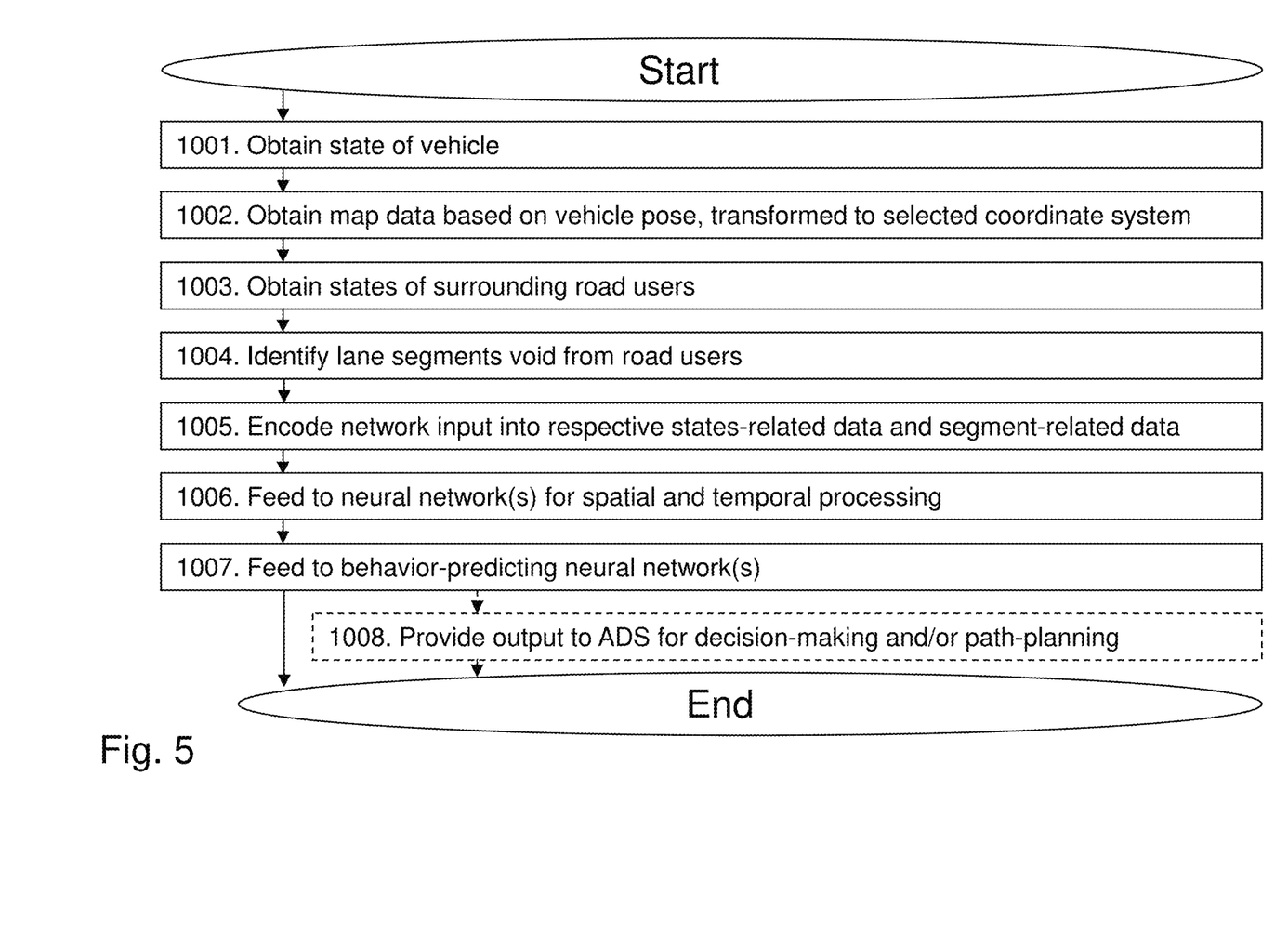
FIG. 5 is a flowchart depicting an exemplifying method performed by an assessment system according to embodiments of the disclosure.

FIG. 5 is a flowchart depicting an exemplifying method performed by an assessment system 1 according to embodiments of the disclosure. Said method is for predicting near-future behavior of road users in surroundings of a vehicle 2. The exemplifying method, which may be continuously repeated, comprises one or more of the following actions discussed with support from FIGS. 1-4. Moreover, the actions may be taken in any suitable order and/or one or more actions may be performed simultaneously and/or in alternate order where applicable. For instance, Actions 1001 and 1003 may be performed in alternate order and/or simultaneously.

Action 1001

In Action 1001, the assessment 1 system obtains—e.g. with support from the vehicle state obtaining unit 101—a state of the vehicle 2, which vehicle state comprises at least a pose of the vehicle 2 in view of a digital map 22.

Action 1002

In Action 1002, the assessment system 1 obtains—e.g. with support from the map data obtaining unit 102—from the digital map 22, map data associated with the vehicle pose, wherein the map data is transformed to a selected coordinate system.

Action 1003

In Action 1003, the assessment system 1 obtains—e.g. with support from the road users states obtaining unit 103—states of road users 3 in the vehicle's 2 surroundings.

Action 1004

In Action 1004, the assessment system 1 identifies—e.g. with support from the lane segments identifying unit 104—by assessing the road users states in view of the map data in the selected coordinate system, lane segments 4 void from road users 3.

Action 1005

In Action 1005, the assessment system 1 encodes—e.g. with support from the data encoding unit 105—network input comprising data associated with the lane segments 4,
data associated with the road users states, and
historic data associated with the road users states and/or lane segments 4,
into respective states-related data 61 associated with the road users states and segment-related data 62 associated with dynamic start and end boundaries of the lane segments 4.

Optionally, Action 1005 of encoding may comprise—and/or the data encoding unit 105 may be adapted and/or configured for—feeding the network input 5 to an encoding neural network 6, e.g. a fully connected neural network, configured to process the network input and output the respective states-related data 61 and segment-related data 62.

Action 1006

In Action 1006, the assessment system 1 feeds—e.g. with support from the spatial/temporal NN feeding unit 106—respective states-related data 61 and segment-related data 62 to one or more neural networks configured to encode the road users states in view of the lane segments 4 spatially and temporally, and output spatial- and temporal-processed respective states-related data 81 and segment-related data 82.

Optionally, Action 1006 of feeding to one or more neural networks may comprise—and/or the spatial/temporal NN feeding unit 106 may be adapted and/or configured for—feeding respective states-related data 61 and segment-related data 62 to a spatial neural network 7 configured to encode the road users states in view of the lane segments 4 spatially, and output spatial-processed respective states-related data 71 and segment-related data 72; and feeding the spatial-processed respective states-related data 71 and segment-related data 72 to a temporal neural network 8 configured to encode the road users states in view of the lane segments 4 temporally, and output spatial- and temporal-processed respective states-related data 81 and segment-related data 82.

Further optionally, Action 1006 of feeding to one or more neural networks may comprise—and/or the spatial/temporal NN feeding unit 106 may be adapted and/or configured for—feeding to a transformer-based network, e.g. supporting multi-head and/or self-attention operations.

Furthermore, optionally, Action 1006 of feeding to one or more neural networks may comprise—and/or the spatial/temporal NN feeding unit 106 may be adapted and/or configured for—feeding to a Long short-term memory, LSTM, network.

Action 1007

In Action 1007, the assessment system 1 feeds—e.g. with support from the predicting NN feeding unit 107—output spatial- and temporal-processed respective states-related data 811 and segment-related data 821 associated with one or more of the road users—referred to as target road user(s) 31—to at least a first behavior-predicting neural network 9 configured to, by processing said data 811, 821, predict and output data 90 indicating predicted near-future behavior of the target road user(s) 31 in view of one or more of the lane segments 4.

Optionally, Action 1007 of feeding to at least a first behavior-predicting neural network 9 may comprise—and/or the predicting NN feeding unit 107 may be adapted and/or configured for—feeding to a graph network, e.g. a graph attention network.

Further optionally, Action 1007 of feeding to at least a first behavior-predicting neural network 9 may comprise—and/or the predicting NN feeding unit 107 may be adapted and/or configured for—feeding to a behavior-predicting neural network 9 configured to, by processing said data 811, 821, predict and output data 90 indicating predicted intentions comprising a probability distribution of the target road user(s) 31 selecting the one or more lane segments 4.

Additionally or alternatively, optionally, Action 1007 of feeding to at least a first behavior-predicting neural network 9 may comprise—and/or the predicting NN feeding unit 107 may be adapted and/or configured for—feeding to a behavior-predicting neural network 9 configured to, by processing said data 811, 821, predict and output data 90 indicating predicted trajectories of one or more of the target road user(s) 31 in view of the one or more lane segments 4.

Action 1008

In optional Action 1008, the assessment system 1 may provide—e.g. with support from the optional output providing unit 108—at least a portion of the data 90 indicating near-future predicted behavior to an ADS 21 of the vehicle 2 for decision-making and/or path-planning.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by an assessment system for predicting near-future behavior of road users in surroundings of a vehicle, the method comprising:
   obtaining a state of the vehicle, the vehicle state comprising at least a pose of the vehicle in view of a digital map;
   obtaining from the digital map, map data associated with the vehicle pose, the map data being transformed to a selected coordinate system;
   obtaining states of road users in the vehicle's surroundings;
   identifying by assessing the road users states in view of the map data in the selected coordinate system, lane segments void from road users;
   encoding network input into respective states-related data associated with the road users states and segment-related data associated with dynamic start and end boundaries of the lane segments, the network input comprising:
   data associated with the lane segments;
   data associated with the road users states; and
   historic data associated with one or both of the road users states and lane segments;
   feeding the respective states-related data and segment-related data to one or more neural networks configured to encode the road users states in view of the lane segments spatially and temporally, and output spatial- and temporal-processed respective states-related data and segment-related data;
   feeding output spatial- and temporal-processed respective states-related data and segment-related data associated with one or more of the road users, the one or more road users being target road users, to at least a first behavior-predicting neural network configured to, by processing the data, predict and output data indicating predicted near-future behavior of the target road users in view of one or more of the lane segments; and providing at least a portion of the data indicating near-future predicted behavior to an automated driving system, ADS, of the vehicle for one or both decision-making and path-planning.

2. The method according to claim 1, wherein the feeding to one or more neural networks comprises:

feeding the respective states-related data and segment-related data to a spatial neural network configured to encode the road users states in view of the lane segments spatially, and output spatial-processed respective states-related data and segment-related data; and feeding the spatial-processed respective states-related data and segment-related data to a temporal neural network configured to encode the road users states in view of the lane segments temporally, and output spatial- and temporal-processed respective states-related data and segment-related data.

3. The method according to claim 1, wherein the feeding to at least a first behavior-predicting neural network comprises feeding to a behavior-predicting neural network configured to, by processing the data, predict and output data indicating predicted intentions comprising a probability distribution of the target road users selecting the one or more lane segments.

4. The method according to claim 1, wherein the feeding to at least a first behavior-predicting neural network comprises feeding to a behavior-predicting neural network configured to, by processing the data, predict and output data indicating predicted trajectories of one or more of the target road users in view of the one or more lane segments.

5. The method according to claim 1, wherein one or more of:

the encoding comprises feeding the network input to an encoding neural network configured to process the network input and output the respective states-related data and segment-related data;

the feeding to one or more neural networks comprises feeding to a transformer-based network;

the feeding to one or more neural networks comprises feeding to a Long short-term memory, LSTM, network; and the feeding to at least a first behavior-predicting neural network comprises feeding to a graph network.

6. The method according to claim 5, wherein the encoding network is a fully connected neural network.

7. The method according to claim 5, wherein the transformer-based network supports one or both multi-head and self-attention operations.

8. The method according to claim 5, wherein the graph network is a graph attention network.

9. An assessment system for predicting near-future behavior of road users in surroundings of a vehicle, the assessment system comprising:

a vehicle state obtaining unit configured to obtain a state of the vehicle, the vehicle state comprising at least a pose of the vehicle in view of a digital map;

a map data obtaining unit configured to obtain from the digital map, map data associated with the vehicle pose, the map data being transformed to a selected coordinate system;

a road users states obtaining unit configured to obtain states of road users in the vehicle's surroundings;

a lane segments identifying unit configured to identify by assessing the road users states in view of the map data in the selected coordinate system, lane segments void from road users;

a data encoding unit configured to encode network input into respective states-related data associated with the road users states and segment-related data associated with dynamic start and end boundaries of the lane segments, the network input comprising:

data associated with the lane segments;

data associated with the road users states; and historic data associated with one of both of the road users states and lane segments, a spatial/temporal NN feeding unit configured to feed the respective states-related data and segment-related data to one or more neural networks configured to encode the road users states in view of the lane segments spatially and temporally, and output spatial- and temporal-processed respective states-related data and segment-related data;

a predicting NN feeding unit configured to feed output spatial- and temporal-processed respective states-related data and segment-related data associated with one or more of the road users, the one or more road users being target road users, to at least a first behavior-predicting neural network configured to, by processing the data, predict and output data indicating predicted near-future behavior of the target road users in view of one or more of the lane segments; and an output providing unit configured to provide at least a portion of the data indicating near-future predicted behavior to an automated driving system, ADS, of the vehicle for one or both decision-making and path-planning.

10. The assessment system according to claim 9, wherein the spatial/temporal feeding unit is configured to:

feed the respective states-related data and segment-related data to a spatial neural network configured to encode the road users states in view of the lane segments spatially, and output spatial-processed respective states-related data and segment-related data; and feed the spatial-processed respective states-related data and segment-related data to a temporal neural network configured to encode the road users states in view of the lane segments temporally, and output spatial- and temporal-processed respective states-related data and segment-related data.

11. The assessment system according to claim 9, wherein the predicting NN feeding unit is configured to feed to a behavior-predicting neural network configured to, by processing the data, predict and output data indicating predicted intentions comprising a probability distribution of the target road users selecting the one or more lane segments.

12. The assessment system according to claim 9, wherein the predicting NN feeding unit is configured to feed to a behavior-predicting neural network configured to, by processing the data, predict and output data indicating predicted trajectories of one or more of the target road users in view of the one or more lane segments.

13. The assessment system according to claim 9, wherein one or more of:

the data encoding unit is configured to feed the network input to an encoding neural network configured to process the network input and output the respective states-related data and segment-related data;

the spatial/temporal feeding unit is configured to feed to a transformer-based network;

the spatial/temporal feeding unit configured to feed to a Long short-term memory, LSTM, network; and the predicting NN feeding unit is configured to feed to a graph network.

14. The assessment system according to claim 13, wherein the encoding network is a fully connected neural network.

15. The assessment system according to claim 13, wherein the transformer-based network supports one or both multi-head and self-attention operations.

16. The assessment system according to claim 13, wherein the graph network is a graph attention network.

17. The assessment system according to claim 9, wherein the assessment system is comprised in a vehicle.

18. A non-transitory computer storage medium storing a computer program that when executed causes a computer or a processor to perform a method for predicting near-future behavior of road users in surroundings of a vehicle, the method comprising:

obtaining a state of the vehicle, the vehicle state comprising at least a pose of the vehicle in view of a digital map;

obtaining from the digital map, map data associated with the vehicle pose, the map data being transformed to a selected coordinate system;

obtaining states of road users in the vehicle's surroundings;

identifying by assessing the road users states in view of the map data in the selected coordinate system, lane segments void from road users;

encoding network input into respective states-related data associated with the road users states and segment-related data associated with dynamic start and end boundaries of the lane segments, the network input comprising:

data associated with the lane segments;

data associated with the road users states; and historic data associated with one or both of the road users states and lane segments;

feeding the respective states-related data and segment-related data to one or more neural networks configured to encode the road users states in view of the lane segments spatially and temporally, and output spatial- and temporal-processed respective states-related data and segment-related data;

feeding output spatial- and temporal-processed respective states-related data and segment-related data associated with one or more of the road users, the one or more road users being target road users, to at least a first behavior-predicting neural network configured to, by processing the data, predict and output data indicating predicted near-future behavior of the target road users in view of one or more of the lane segments; and providing at least a portion of the data indicating near-future predicted behavior to an automated driving system, ADS, of the vehicle for one or both decision-making and path-planning.

\* \* \* \* \*